Figure 1:
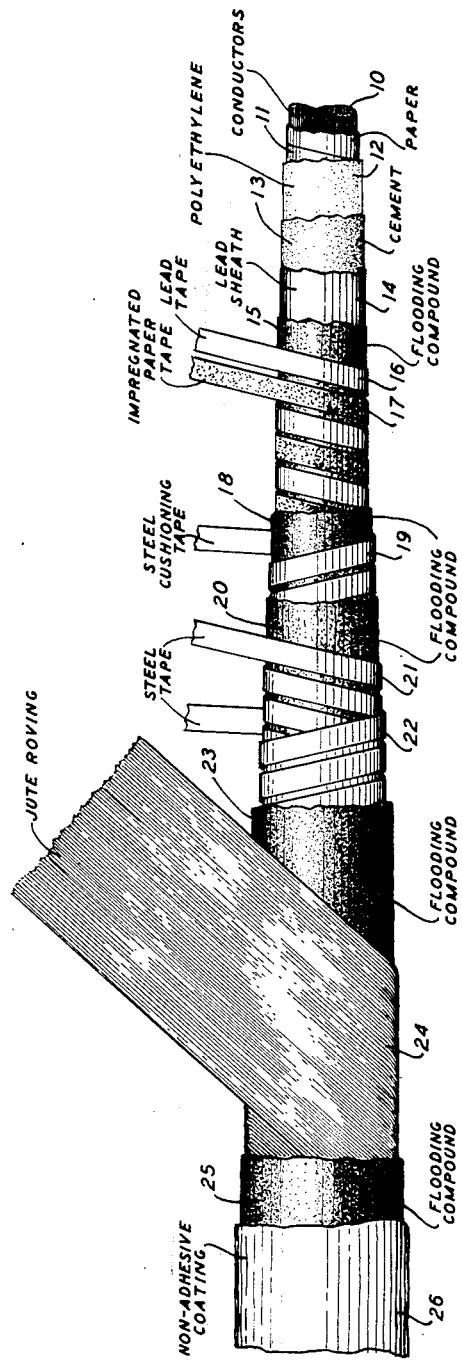

Patented Dec. 15, 1953

2,662,931

UNITED STATES PATENT OFFICE 2,662,931

SPIRALLY APPLIED, CONDUCTIVELY-CONTACTING CABLE ARMOR

Wilbur E. Mougey, Summit, N. J., assignor to Bell Telephone Laboratories, Incorporated, New York, N. Y., a corporation of New York Application November 3, 1949, Serial No. 125,245

6 Claims. (Cl. 174—106)

This invention relates to armored cable and more particularly to a protection to be applied over lead sheath cable which is intended to be buried directly in the ground.

One object of the present invention is to provide an economical protection for buried cable which is less susceptible to damage from lightning strokes than the present types of steel tape armored cable and at the same time assures protection against injuries to the lead sheath from mechanical causes and from corrosion.

Heretofore standard tape armor protection for buried cable has comprised two layers of steel tape usually 20 to 40 mils in thickness, depending upon the cable size. These tapes were protected from corrosion by an outside covering of jute suitably impregnated and covered with an asphalt compound. Located between the lead sheath and the steel tape, a bedding of Sisalkraft paper and jute protected the sheath from injury by the heavy steel tape. This bedding had an appreciable, though not high, dielectric strength and when a lightning current hit the cable, breakdown between the steel tape and the sheath occurred and the arc produced frequently caused an explosive expansion of gas, which was restricted by the strong steel tape, thereby crushing the sheath and the cable core. In many instances, the arc burned a hole in the lead sheath which made it necessary in many locations to use a more expensive sheath protection especially designed against lightning, consisting of a high dielectric strength thermoplastic compound and a conductive shield of copper tape, where otherwise standard tape armor could have been used at a considerable saving in cost.

The present invention involves means assuring a continuous electrical contact between the sheath of a lead covered cable and the protective tape so that disruptive arcs cannot occur when lightning current hits the cable.

Specifically, and in one embodiment, this entails provision of a conductive bedding between the steel tapes and the lead sheath. This is accomplished by applying helically a serving of ten mil lead-alloy tape, for example a lead antimony tape having a predominatory percentage of lead, over the lead sheath with a thin layer of flooding compound, such as asphalt, interposed therebetween.

When the lead tape is applied in the latter manner, it may be parallel with a serving of asphalt impregnated paper tape known commercially as Sisalkraft. The lead tape or combination of lead tape and asphalt impregnated paper provides the necessary bedding for protecting the lead sheath from the steel tape and establishes mechanical and electrical contacts therewith by cutting its way through the thin layer of flooding compound.

Over the lead tape, or the combination of lead tape and paper, a thin layer of flooding compound is applied over which a serving of ten mil steel tape is applied helically with a gap between adjacent turns, which serves to protect the enclosed structure from mechanical damage from the heavier steel tape on the outside of the cable and makes mechanical and electrical contacts with the lead tape by cutting through the flooding compound. The width of these tapes may vary from one-half inch to one and one-half inches with gaps of from one-sixteenth to five thirty-seconds of an inch, respectively, depending on the diameter of the lead sheath cable, and is applied in a direction of lay reverse to that of the lead tape and the paper tape.

Over this tape a thin layer of flooding compound is applied over which two servings of twenty mil steel tape are helically applied with a gap between adjacent turns. In small sized cables, i. e., those less than one inch in diameter, these tapes are applied in reverse directions and the width of these tapes may vary from one-half inch to two inches with gaps of three-thirty-seconds to one-half inch, depending upon the diameter of the lead sheath cable.

In the larger sizes of cable, i. e., one inch and over, these tapes are wound in the same direction and overlap so that the outer tape covers the gap between the turns of the inner tape.

Over the outside of the steel tape, servings of jute roving or yarn, having a layer of flooding compound therebetween are applied. A suitable non-adhesive coating is applied over the final layer of jute roving to prevent sticking of adjacent turns on a reel.

Figure 2:
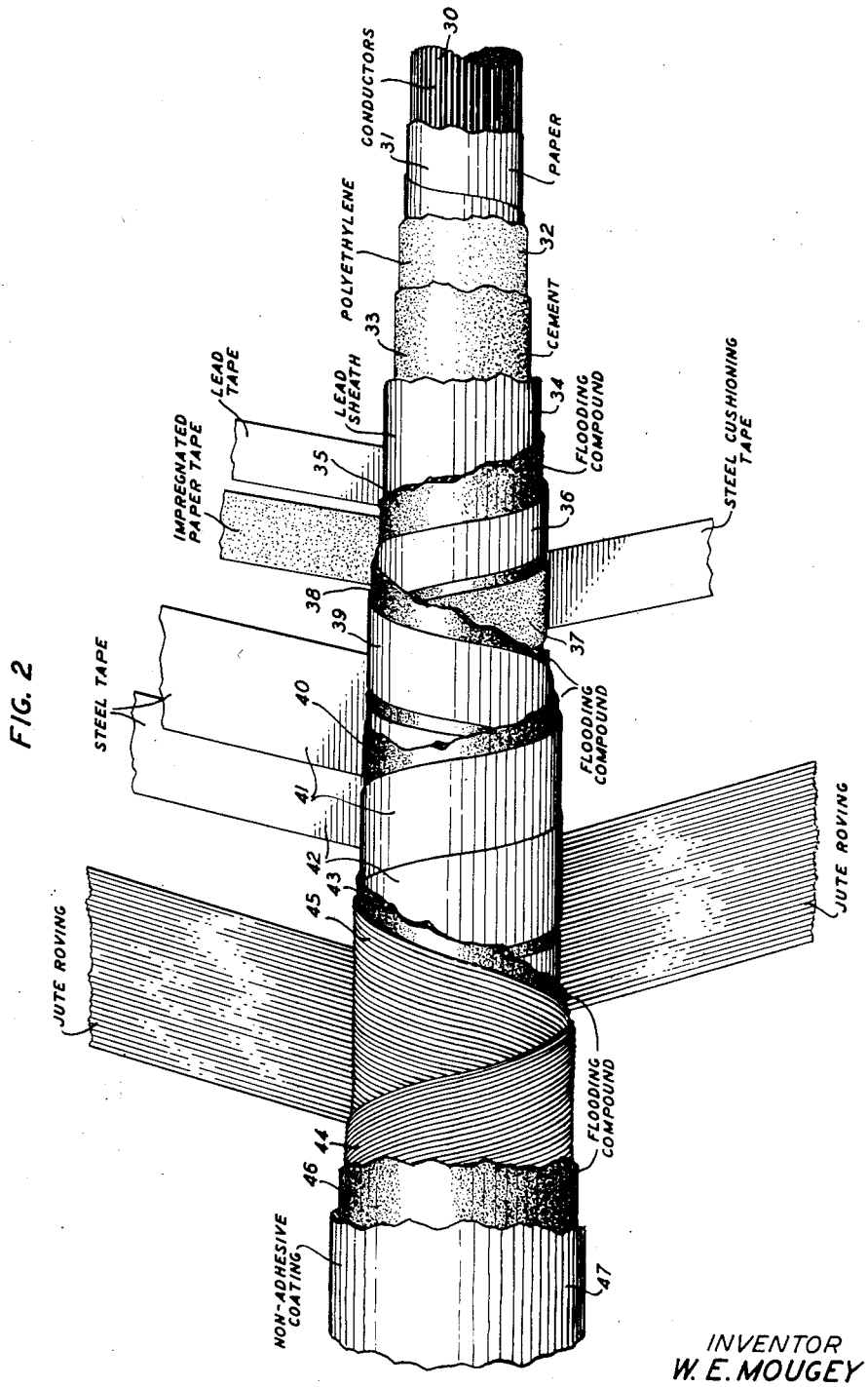

The invention will be clearly understood from the following detailed description with reference to the accompanying drawings in which:

Fig. 1 shows a fragment of one type of cable with various layers broken away to illustrate the internal construction and discloses one final covering of jute roving and two narrow steel tapes wound in opposite directions and having an air gap between; and Fig. 2 depicts a fragment of a cable with various layers broken away to show the internal construction and shows two layers of jute roving wound in opposite directions and two layers of steel tape wound in the same direction, one overlapping the other.

Referring now to Fig. 1, the cable structure therein illustrated comprises a plurality of paper insulated conductors 10 having a layer of helically wound paper tape 11 thereover. Over the paper 11 is extruded a layer of polyethylene 12 which has thereon a coating of suitable cement 13 over which the lead sheath 14 is extruded. A suitable asphalt flooding compound 15 is applied over the lead sheath 14 and a lead tape 16 and an impregnated paper tape 17 such as Sisalkraft are tightly wound therearound in alternate lays and spaced apart from each other, as shown, the pressure of the lead tape 16 causing the flooding compound 15 to be displaced, thereby permitting the tape 16 to establish mechanical and electrical contact with the lead sheath 14.

When the flooding compound 15 is displaced from under the tape 16 it will be forced into the interstices between the lays of the tapes 16 and 17 thereby securing them tightly in place.

After the paper tape 17 and the lead tape 16 have been applied as shown, a suitable asphalt flooding compound 18 is applied thereover and a steel tape 19 is wound tightly therearound in spaced-apart lays as shown and cuts through the flooding compound 18 to establish mechanical and electrical contacts with the lead tape 16.

Over the steel tape 19 is applied a flooding compound 20 which has applied thereover two steel tapes 21 and 22; these tapes are tightly wound, one over the other, in opposite directions, are spaced apart in their lays with the innermost tape 21 cutting through the flooding compound 20 and making electrical and mechanical contact with the steel tape 19.

Over the tapes 21 and 22 is applied a layer of flooding compound 23 which has wound thereover a layer of jute roving or yarn 24, which comprises an asphalt-saturated jute material. Over the jute roving 24 is applied a flooding compound 25 to firmly hold the jute roving in place. A finish coating of a non-adhesive material, for example a mixture by weight of not less than one nor more than two percent glue, not less than forty-nine percent calcium carbonate and the balance water, is applied over the flooding compound 25 to provide a finished surface to the cable.

The cable structure, as shown in Fig. 2, is a modification of the structure shown in Fig. 1 and is particularly advantageous for larger size cable. It comprises a group of paper-insulated conductors 30 having a suitable paper tape wrapping 31 therearound over which is applied a layer of polyethylene 32 which has a cement compound 33 applied thereover. Over the cement 33 is extruded the lead sheath 34 which has applied thereover a suitable flooding compound 35.

A lead tape 36 and an impregnated paper tape 37 are tightly wound over the flooding compound 35 in alternate lays and spaced apart from each other as shown, the pressure of the lead tape 36 cutting through the compound 35 and establishing mechanical and electrical contacts with the lead sheath 34.

Over the tapes 36 and 37 is applied a layer of suitable flooding compound 38, which has applied thereover a steel tape 39.

Over the steel tape 39 is applied a suitable flooding compound 40 over which a pair of steel tapes 41 and 42 are tightly wrapped in the same direction with the tape 42 overlapping the gap between the edges of the tape 41. The tape 41 cuts through the flooding compound 40 and establishes mechanical and electrical contacts with the tape 39.

Over the tapes 41 and 42 is applied a suitable flooding compound 43 over which two layers of jute roving or yarn 44 and 45 are wrapped in opposite directions, over which is applied a flooding compound 46 over which a non-adhesive coating 47 is applied for a finish coating.

While there has been shown and described a preferred embodiment of my invention, it is to be understood the various modifications and changes may be made therein without departing from the spirit and scope of the invention.

What is claimed is:

1. An armored cable comprising a plurality of insulated conductors, a lead sheath enclosing said conductors, a coating of flooding compound on said sheath, a pair of tapes of dissimilar material applied side by side over said compound in the same direction, a second coating of flooding compound applied over said tapes, a spirally wound metal cushioning tape embedded in said compound and applied in a direction opposite to that of said first pair of tapes, a third coating of flooding compound over said cushioning tape, a pair of metal tapes embedded therein, one of said tapes wound in a direction the same as that of said first pair of tapes, a fourth coating of flooding compound over said second pair of tapes and having a serving of jute roving thereover and a finish coat over said roving comprising a layer of flooding compound and a coating of a non-adhesive material.

2. An armored cable comprising a plurality of insulated conductors, a lead sheath enclosing said conductors, a coating of flooding compound on said sheath, a pair of tapes one lead and one fibrous applied side by side over said compound in the same direction, a second coating of flooding compound applied over said tapes, a spirally wound metal cushioning tape embedded in said compound and applied in a direction opposite to that of said pair of tapes, a third coating of flooding compound over said cushioning tape, a pair of metal tapes embedded therein, one of said tapes wound in a direction the same as that of said first pair of tapes, a fourth coating of flooding compound over said second pair of tapes and having a serving of jute roving thereover and a finish coat over said roving comprising a layer of flooding compound and a coating of a non-adhesive material.

3. An armored cable comprising a plurality of conductors, a lead sheath enclosing said conductors, a coating of flooding compound on said sheath, a pair of tapes of dissimilar material applied side by side over said compound in the same direction, a second coating of flooding compound applied over said tapes, a spirally wound metal cushioning tape embedded in said compound and applied in a direction opposite to that of said first pair of tapes, a third coating of flooding compound over said cushioning tape, a pair of metal tapes, oppositely wound one over the other, embedded therein, a fourth coating of flooding compound over said pair of tapes and having a serving of jute roving thereover, and a finish coat over said roving comprising a layer of flooding compound and a coating of a non-adhesive material.

4. An armored cable comprising a plurality of insulated conductors, a lead sheath enclosing said conductors, a coating of flooding compound on said sheath, a pair of tapes one lead and one fibrous applied side by side over said compound in the same direction, a second coating of flooding compound applied over said tapes, a spirally wound metal cushioning tape embedded in said compound and applied in a direction opposite to that of said first pair of tapes, a third coating of flooding compound over said cushioning tape, a pair of metal tapes, oppositely wound one over the other, embedded therein and wound in a direction opposite from that of said cushioning tape, a fourth coating of flooding compound over said pair of tapes and having a serving of jute roving thereover, and a finish coating over said roving comprising a layer of flooding compound and a coating of a non-adhesive material.

5. An armored cable comprising a plurality of insulated conductors, a lead sheath enclosing said conductors, a coating of flooding compound on said sheath, a pair of tapes of dissimilar material applied side by side over said compound in the same direction, a second coating of flooding compound applied over said tapes, a spirally wound metal cushioning tape embedded in said compound applied in a direction opposite to that of said first pair of tapes and embedded therein, a third coating of flooding compound over said cushioning tape, a pair of overlapping metal tapes embedded therein and wound in a direction the same as that of said first pair of tapes, a fourth coating of flooding compound over said pair of overlapping tapes and having two servings of oppositely wound jute roving thereover, and a finish coating over said roving comprising a layer of flooding compound and a coating of a non-adhesive material.

6. An armored cable comprising a plurality of insulated conductors, a lead sheath enclosing said conductors, a coating of flooding compound on said sheath and having a pair of tapes one lead and one fibrous applied side by side over said compound in the same direction, a second coating of flooding compound applied over said tapes, a spirally wound metal cushioning tape embedded in said compound and wound in a direction opposite to that of said pair of tapes, a third coating of flooding compound over said cushioning tape, a pair of overlapping metal tapes embedded therein and wound in a direction the same as that of said first pair of tapes, a fourth coating of flooding compound over said pair of overlapping tapes and having two servings of oppositely wound jute roving thereover, and a finish coating over said roving comprising a layer of flooding compound and a coating of a non-adhesive material.

WILBUR E. MOUGEY.

References Cited in the file of this patent

UNITED STATES PATENTS

| Number | Name | Date |
|---|---|---|
| 1,858,772 | Frederickson | May 17, 1932 |
| 1,935,323 | Kemp et al. | Nov. 14, 1933 |
| 2,216,435 | Eckel | Oct. 1, 1940 |
| 2,253,138 | Savage et al. | Aug. 19, 1941 |
| 2,442,307 | McMahon | May 25, 1948 |

FOREIGN PATENTS

| Number | Country | Date |
|---|---|---|
| 92,432 | Sweden | May 31, 1938 |
| 173,872 | Switzerland | Dec. 15, 1934 |
| 597,957 | Great Britain | Feb. 6, 1948 |
| 667,407 | Sweden | Nov. 10, 1938 |